under 35 U.S.C. 154(b) by 638 days.

United States Patent
Allison

(10) Patent No.: US 8,125,379 B2
(45) Date of Patent: Feb. 28, 2012

(54) POSITION MEASUREMENT RESULTS BY A SURVEYING DEVICE USING A TILT SENSOR

(75) Inventor: Michael Timo Allison, East Grimstead (GB)

(73) Assignee: Trimble Navigation Limited, Sunnyvale, CA (US)

( * ) Notice: Subject to any disclaimer, the term of this patent is extended or adjusted under 35 U.S.C. 154(b) by 638 days.

(21) Appl. No.: 12/111,137

(22) Filed: Apr. 28, 2008

(65) Prior Publication Data

US 2009/0267827 A1  Oct. 29, 2009

(51) Int. Cl.
*G01S 19/10* (2010.01)
(52) U.S. Cl. .................................................. 342/357.47
(58) Field of Classification Search ............. 342/357.01, 342/357.17, 357.2–357.78
See application file for complete search history.

(56) References Cited

U.S. PATENT DOCUMENTS

| | | | |
|---|---|---|---|
| 5,512,905 A | 4/1996 | Nichols et al. | |
| 5,929,807 A | 7/1999 | Viney et al. | |
| 6,140,957 A * | 10/2000 | Wilson et al. | 342/357.32 |
| 6,633,256 B2 * | 10/2003 | Zhdanov et al. | 342/357.32 |
| 7,310,137 B2 * | 12/2007 | Nichols | 356/139.01 |
| 7,526,384 B2 * | 4/2009 | MacIntosh et al. | 702/5 |

FOREIGN PATENT DOCUMENTS

EP  1 726 915 A1  11/2006

\* cited by examiner

*Primary Examiner* — Thomas Tarcza
*Assistant Examiner* — Nga X Nguyen
(74) *Attorney, Agent, or Firm* — Perkins Coie LLP

(57) ABSTRACT

A surveying apparatus includes an antenna to receive a positioning signal. The surveying apparatus further includes a tilt sensor to obtain a tilt measurement that indicates a degree of tilt of the survey apparatus. The surveying apparatus further includes a processor to obtain a positioning measurement from the positioning signal, and to determine a degree of accuracy of the positioning measurement based on the tilt measurement.

20 Claims, 7 Drawing Sheets

POSITION MEASUREMENT RESULTS BY A SURVEYING DEVICE USING A TILT SENSOR

TECHNICAL FIELD

Embodiments of the present invention relate to surveying, and more specifically to improving the accuracy of position measurement results obtained by a surveying device using a tilt sensor.

BACKGROUND

Current surveying techniques involve a reference antenna/receiver located at a known point and a single operator who moves about with a roving antenna/receiver, or "GPS total station". The operator stops on various unknown points to record position information in a data collector using signals transmitted by a minimum number of satellites which are above the horizon. The satellite positions are monitored closely from earth and act as reference points from which an antenna/receiver in the field is able to determine position information. By measuring the travel time of signals transmitted from a number of satellites, the receiver is able to determine corresponding distances from the satellites to the antenna phase center, and then the position of the antenna by solving a set of simultaneous equations. The roving antenna is carried atop a range pole which is held by the operator, although the roving antenna need not be within sight of the reference antenna. A vector or baseline is determined from the reference site to the rover.

Surveyors require a position measurement for the ground point below the roving antenna (or below the prism in traditional procedures) rather than the position of the antenna itself. It is the ground point positions which are required when staking out an area for residential development, for example. However, it is not usually possible to place the antenna directly on the ground point because of signal reflection and satellite obstruction effects, and a separate measurement of the antenna height on the range pole must normally be made. The range pole must also be oriented vertically over the ground point for a short time. Experience has shown that manual mistakes made by surveyors when placing and orienting the pole are the most common source of error in satellite based surveying techniques. Departures of the pole from verticality over the ground point are particularly significant.

To reduce these errors in traditional surveying, and improve the reliability of survey measurements, two prisms are sometimes placed along the range pole so that a vector towards the ground point may be determined by the theodolite. The range pole must still be held immobile by the second operator for an appreciable period and the process is not particularly convenient. Use of two antennas in a similar fashion with satellite based techniques is also possible but cumbersome. Instead, most range poles currently incorporate a spirit level device or "bullseye bubble" to provide a visual check on verticality for the surveyor. These are susceptible to damage in the field, and surveyors are not necessarily vigilant throughout the dozens or possibly hundreds of points which are measured during a typical work period.

Some rover poles incorporate an electronic tilt sensor and compass to determine a position at an end of the rover pole regardless of the pole's orientation. Such rover poles use tilt, azimuth, and a position measurement to determine a position of a point of interest using trigonometry. However, compasses (including flux-gate compasses) and other devices for checking azimuth are generally not accurate enough to determine a position in such a manner with a high degree of confidence (e.g., compass readings are often deflected by local machinery and vehicles found on construction sites). Moreover, such devices can be prohibitively expensive.

BRIEF DESCRIPTION OF THE DRAWINGS

The present invention is illustrated by way of example, and not by way of limitation, and can be more fully understood with reference to the following detailed description when considered in connection with the figures in which.

DETAILED DESCRIPTION

Described herein is a method and system for surveying. In one embodiment, multiple Global Navigation Satellite System (GNSS) positioning measurements that indicate a position of a surveying device are obtained. Multiple tilt measurements that indicate a degree of tilt of the surveying device are also obtained. Each of the tilt measurements can be associated with one of the positioning measurements. The tilt measurements can be used to determine a degree of accuracy of the positioning measurements. In one embodiment, sets of positioning measurements are obtained, and a weighting factor is applied to each set of positioning measurements based on the associated tilt measurement. The weighting factor can represent an amount of error caused by the degree of tilt. In another embodiment, a determination as to whether to accept or reject each of the positioning measurements is made based on that positioning measurement's corresponding tilt measurement. A position result is calculated using the positioning measurements (e.g., the accepted positioning measurements) and/or the weighting factors. Thus, tilt measurements can be used to improve an accuracy of a position result without detecting an azimuth or a direction of tilt.

As used herein, the term that "surveying" includes, but is not limited to, topographic, geodetic, detail, stakeout, site checking, boundary and local control work. The present invention is potentially useful in all such aspects of surveying, and in any other work which involves an operator who takes measurements with a survey pole or equivalent device. Embodiments of the invention can be useful with any remote positioning system that is suitable for survey work, whether satellite based (e.g., global positioning system (GPS), the global orbiting navigation system (GLONASS), Galileo, COMPASS, etc.) or land based (e.g., a radio navigation system that simulates a configuration of satellites).

Embodiments of the present invention can be implemented with a wide variety of survey related equipment and software. Embodiments of the present invention include various processes that may be implemented by specially-designed hardware components or may be implemented by a programmable hardware device executing machine-executable instructions. Alternatively, the processes may be performed by a combination of these approaches.

Figure 1:
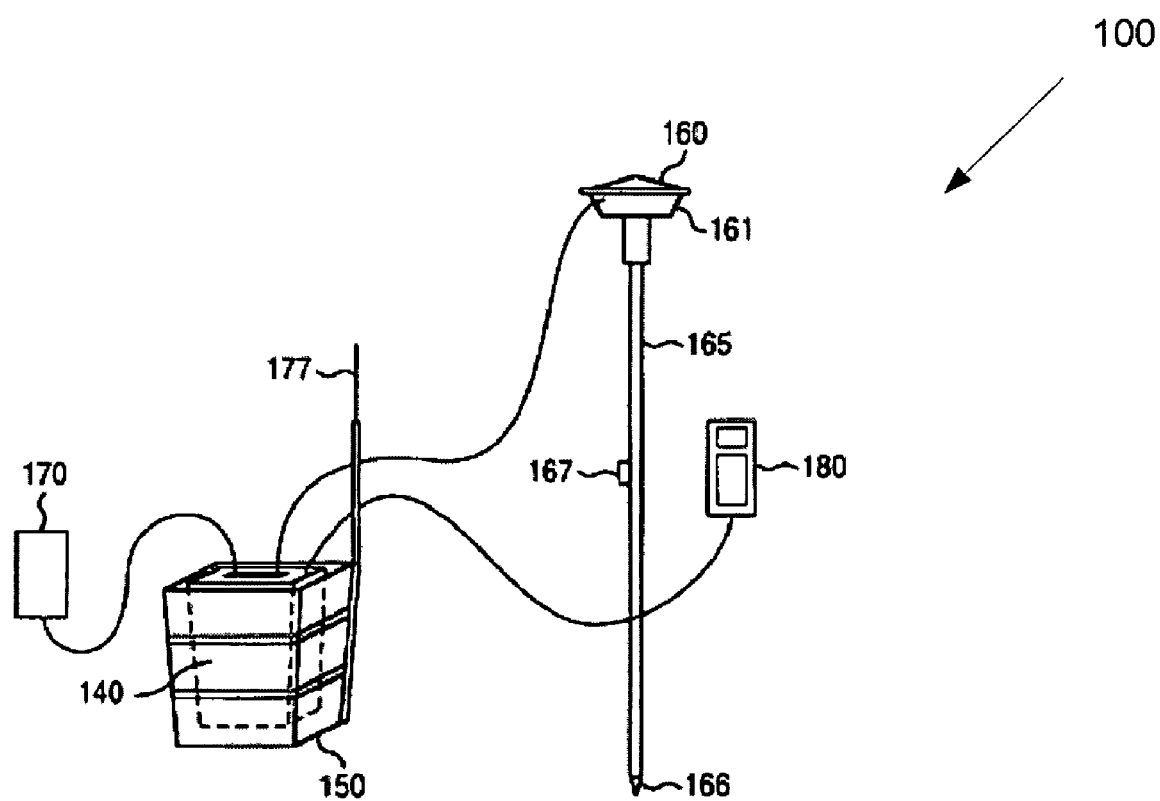
FIG. 1 illustrates exemplary surveying equipment, that can be used to perform surveying work in accordance with embodiments of the present invention.

FIG. 1 illustrates exemplary surveying equipment 100, such as a global positioning system (GPS) total station, that can be used to perform surveying work in accordance with embodiments of the present invention. Exemplary surveying equipment 100 includes a survey pole 165 (also known as a range pole or roving pole) having a global navigation satellite system (GNSS) antenna 160 mounted at a first end. GNSS antenna 160 receives positioning signals (e.g., radio frequency signals that include positioning information) from multiple satellites of a satellite system, and sends these positioning signals to a GNSS receiver 140, to which it is connected.

GNSS receiver 140 may be attached to the GNSS antenna 160 and/or the survey pole 165, or may be separate from the GNSS antenna 160 or survey pole 165. In the illustrated embodiment, GNSS receiver 140 is carried in a backpack 150. Alternatively, GNSS receiver 140 may be attached to a handheld survey controller 180 (also known as a field control unit), or another portable device.

GNSS receiver 140 receives the positioning signals received by the GNSS antenna 160, and obtains positioning measurements therefrom. The positioning signals may be received in sets, wherein each positioning signal in a set corresponds to the same point in time. Furthermore, each positioning signal in a set may be from a different satellite. Positioning measurements (otherwise known as ranging measurements) are obtained by detecting (e.g., demodulating or tracking) a positioning measurement from the positioning signal. Positioning measurements may include pseudo-random number (PRN) code measurements and/or carrier phase measurements. In one embodiment, GNSS receiver 140 carries out detailed analysis of the positioning signals to determine position data or actual position coordinates for the antenna. Alternatively, GNSS receiver 140 may store the positioning measurements for later analysis (e.g., by positioning software resident on another device such as a server or personal computer).

In one embodiment, a tilt sensor 167 is attached to (e.g., attached to an outside of, or embedded inside) survey pole 165. Alternatively, tilt sensor 167 may be attached to GNSS antenna 160, integrated with GNSS receiver 140 (e.g., where the GNSS receiver 140 is attached to survey pole 165), etc. Tilt sensor 167 may be an electronic tilt sensor, such as an accelerometer (e.g., a micro-electro-mechanical systems (MEMS) accelerometer), a gyroscope, etc. Tilt sensor 167 measures a degree of tilt of the survey pole 165 and/or GNSS antenna 160. Generally, the location of a point to be measured is located at a contact end 166 of the survey pole 165. However, the GNSS antenna 160 is usually located at an opposite end of the survey pole 165. Therefore, positioning measurements are generally most accurate when the survey pole 165 is positioned vertically (with zero tilt).

A handheld survey controller 180 can be connected to the GNSS receiver 140, and may be attached to the backpack 150, the survey pole 165, carried in a hip pack, etc. The survey controller 180 generally has a keypad or other input facility through which a surveyor may input attribute information and commands, and a display on which measurement results such as actual coordinates, measured tilt and quality statistics or related items of information are presented. Survey controller 180 provides a convenient interface by which an operator can control the GNSS receiver 140, store position information, determine a tilt of the survey pole 165, etc. The survey controller 180 may also provide directions to guide a user through aspects of a survey procedure. In one embodiment, survey controller 180 includes controls to perform collection, analysis and/or storage of data.

Logic (e.g., hardware and/or software) that enables antenna positioning signals to be recorded, positioning measurements may be detected, and actual ground point positions to be determined, can be installed in survey controller 180, receiver 140, or a combination thereof. Techniques for accurately determining a position can involve either kinematic measurements (where the GNSS antenna 160 is free to move and the determined positions are moving) or static measurements (where the GNSS antenna 150 is stationary and a single position is determined). In one embodiment, the logic accepts or rejects positioning measurements based on a detected tilt of the survey pole 165 and/or GNSS antenna 160 by the tilt sensor 167. Accepted positioning measurements may then be used to accurately determine intermediate position results for a location, which in turn may be used to calculate a final position result. In another embodiment, the logic calculates a weighting factor for each intermediate position result (e.g., for each set of positioning measurements used to calculate the intermediate position result) based on the detected tilt. Weighting factors can then be applied to the positioning measurements to more accurately determine a final position result for a location. Such techniques, and logic for accomplishing such techniques, are discussed in greater detail with reference to FIG. 3.

Returning to FIG. 1, in the illustrated embodiment the GNSS antenna 160, GNSS receiver 140 and handheld survey controller 180 are provided as separate components of surveying equipment 100, connected together by suitable cables. Alternatively, one or more of the GNSS antenna 160, GNSS receiver 140 and handheld survey controller 180 may be connected wirelessly (e.g., using wireless fidelity (WiFi), Bluetooth, etc.). In other embodiments, the GNSS antenna 160, GNSS receiver 140 and/or survey controller 180 are combined into one or more devices. For example, GNSS receiver 140 may be incorporated within a housing of the GNSS antenna 160, or within the survey controller 180 (e.g., built in, or added by a plug-in device, such as a Personal Computer Memory Card International Association (PCMCIA) card).

A contact end 166 of the survey pole 165 can be placed on an unknown ground point to be measured. In one embodiment, the length of the survey pole can be varied depending on the nature of the ground point. For example, the pole may be shortened to place the contact point 166 on top of a fence post, or lengthened to place the antenna 160 clearly above the surveyor's head if there are obstructions that would make measurements difficult otherwise. Satellite distance measurements determine the antenna position and more specifically that of a phase center within the antenna housing 161, rather than that of the ground point directly. The distance between the phase center and the contact end 166 is then calculated to determine an offset to apply to positioning measurements. Such a distance may be fixed or variable, and may be automatically applied to positioning measurements, or manually input by a surveyor. The distance is normally subtracted from the antenna elevation to determine the true ground point coordinates. Error that can arise in relation to verticality of the survey pole may be eliminated or at least reduced by manipulating the pole and processing the resulting data according to embodiments of the present invention.

In one embodiment, during a survey the backpack 150 and survey pole 165 are carried from one location to another, and contact end 166 of the pole is placed on one or more unknown ground points. The pole is positioned as near vertically over the ground point as possible so that a measurement of the position of antenna 160 translates to that of the ground point by a simple subtraction of the pole length from the elevation coordinate as mentioned above. The surveyor may use the keypad on the survey controller to initiate a positioning measurement, and preferably holds the survey pole 165 immobile until the survey controller 180 indicates that sufficient precision has been achieved. Data may eventually be downloaded to another computer from the GNSS receiver 140 and/or the survey controller 180 for post processing, further analysis, or mapping as required.

It should also be remembered that functions of analysis and storage may be distributed between the receiver 140, controller 180, and/or a remote device in a variety of ways. Real time analysis of measurements may take place entirely within the GNSS receiver 140, with final position results being stored in the survey controller 180. Alternatively, the GNSS receiver 140 may output a series of positioning measurements and/or intermediate position results that are then processed by survey controller 180. The GNSS receiver 140 could also both analyze and store the intermediate and/or final position results, with the survey controller 180 providing only an interface with the operator.

A mobile radio transceiver 170 with antenna 177 can be connected to the GNSS receiver 140 to enable communication with one or more base stations (not shown). Mobile radio transceiver 170 can exchange information with fixed base stations and/or mobile base stations. Mobile transceiver 170 may also exchange information with a Virtual Base or "Reference" station that can be synthesized by a network of based stations (referred to as a Virtual Reference Station (VRS™) system). Such a connection can provide synchronized or unsynchronized measurements between surveying equipment 100 and base station. This enables real time processing of position data to be performed.

In one embodiment, the radio transceiver 170 includes a cellular phone (not shown) that transmits and receives position information using mobile phone communication standards (e.g., global systems for mobile (GSM), general packet radio service (GPRS), time division multiple access (TDMA), core division multiple access (CDMA), etc.). In another embodiment, the radio transceiver 170 communicates using a satellite radio link. The radio transceiver 170 may also use other communications standards to wirelessly communicate.

Figure 2:
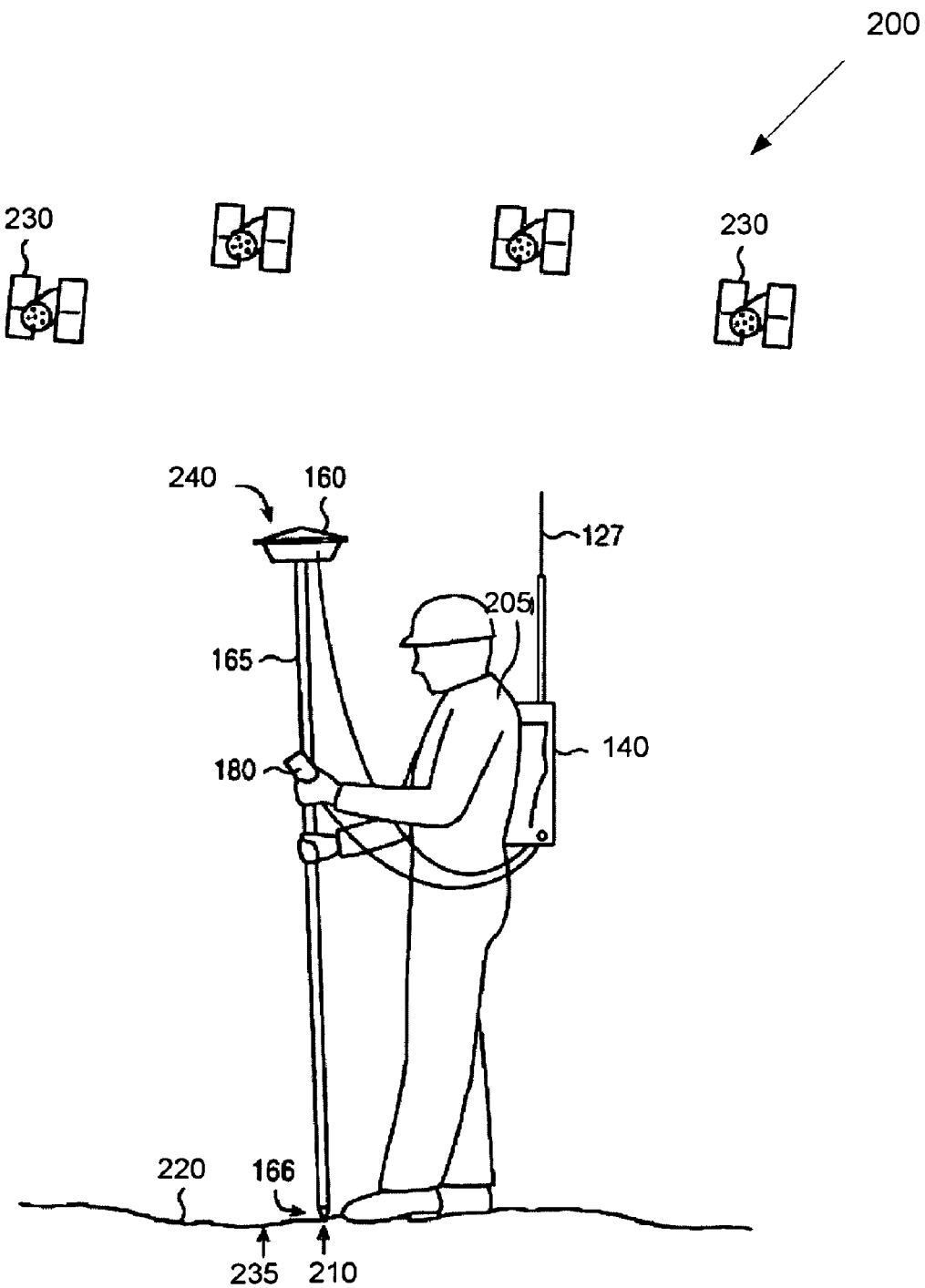
FIG. 2 illustrates a surveying system, in accordance with one embodiment of the present invention.

FIG. 2 illustrates a surveying system 200, in accordance with one embodiment of the present invention. In the illustrated embodiment, a surveyor 205 is shown in the process of placing a survey pole 165 to measure the position of point 210 in an area of ground 220. Four satellites 230 are also shown as part of a remote positioning system, which is preferably, though not necessarily, a satellite based system such as GPS mentioned above. In one embodiment, at least four satellites must normally be present somewhere above the horizon, in suitable relative positions, for an accurate intermediate position result of the GNSS antenna 160. A separate positioning measurement can be obtained from each satellite, and the set of positioning measurements can be combined to determine an intermediate position result. Multiple intermediate position results may be combined to determine a final position result.

Surveyor 205 is shown as observing a display on survey controller 180, or a like device, which may indicate a position of the GNSS antenna 160. The survey controller 180 may also indicate a precision of the measurements, whether the measurements are accepted or rejected, a weighting factor to be applied to the measurements, an intermediate position result, a final position result, etc. The surveyor 205 would ordinarily attempt to orient the pole so that the antenna phase center 240 is located directly over ground point 210 without any deviation from verticality. The distance between the phase center 240 and the contact end 166 of the pole would then be subtracted from the antenna position—in one embodiment by software in the survey controller 180 or GNSS receiver 140—when calculating an elevation of ground point 210. At the instant shown in FIG. 2, however, the survey pole 165 is at an angle which is several degrees from vertical. A positioning measurement or set of positioning measurements recorded at this point would incorrectly indicate the position of point 210 as that of point 230, which is displaced several centimeters horizontally and is lower than the intended point 210. This angle may cause positioning measurements to be rejected, or may cause a small weighting factor to be applied to the positioning measurements, as described below. The weighting factor can decrease the significance of an intermediate position result determined from the positioning measurements when the intermediate position result is combined with other intermediate position results to determine the final position result.

Figure 3:
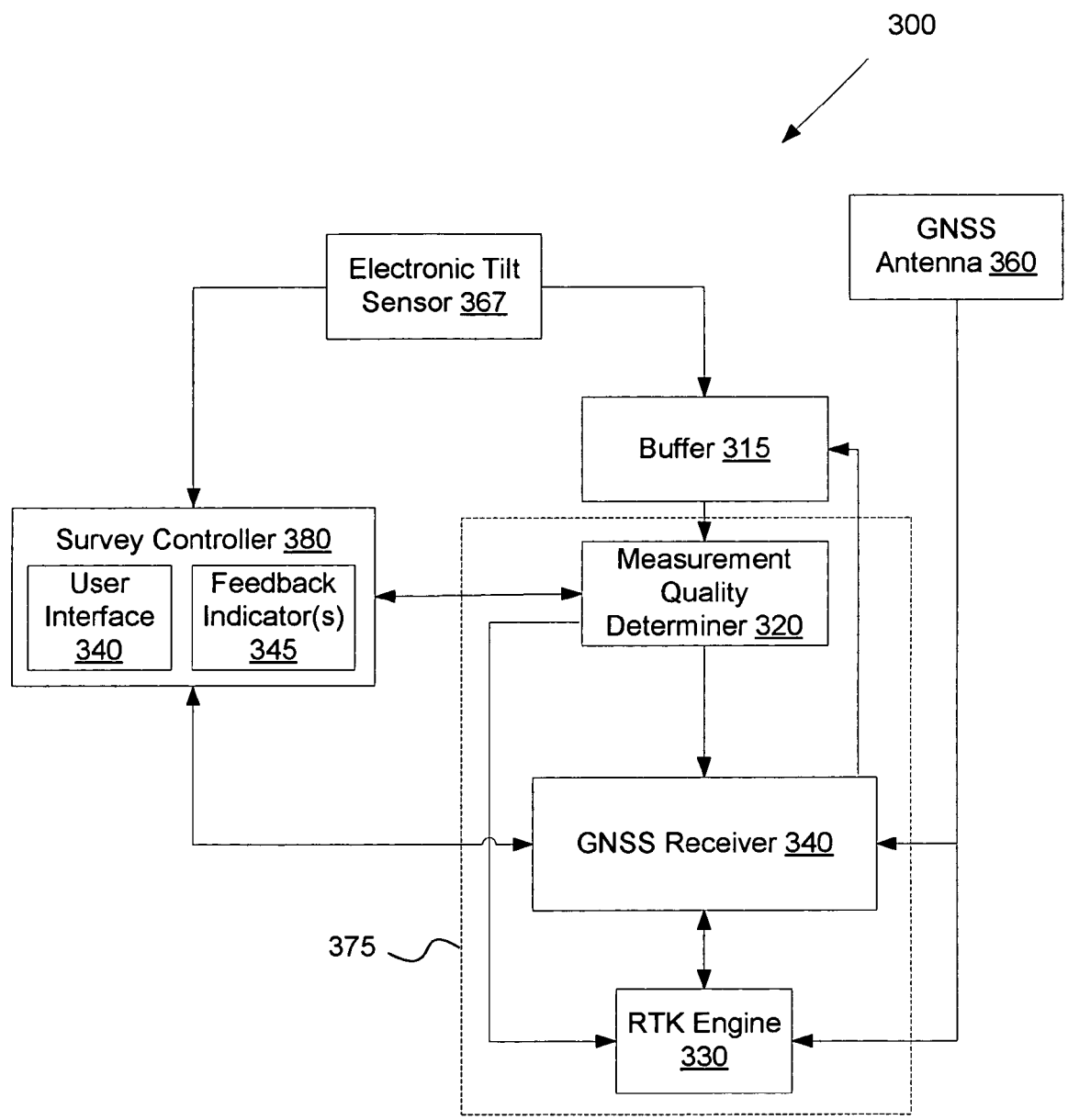
FIG. 3 is a block diagram illustrating surveying equipment, in accordance with one embodiment of the present invention.

FIG. 3 is a block diagram illustrating surveying equipment 300, in accordance with one embodiment of the present invention. In one embodiment, surveying equipment 300 corresponds to surveying equipment 100 of FIG. 1. In one embodiment, surveying equipment 300 includes a GNSS antenna 360 and survey controller 380 connected with a GNSS receiver 340. GNSS antenna 360 receives positioning signals, and passes them on to GNSS receiver 340. GNSS receiver 340 can then detect positioning measurements from the positioning signals and/or determine position results. In one embodiment, positioning measurements and/or position results are determined by real time kinematic (RTK) engine 330. RTK engine 330 may apply a static measurement solution (in which it is assumed that the survey pole remains steady during measurement) or a non-static measurement solution (in which no assumptions are made as to whether the survey pole remains steady). Once positioning measurements are detected, they are buffered in buffer 315.

An electronic tilt sensor 367 is connected to buffer 315 and/or to survey controller 180. In one embodiment, electronic tilt sensor 367 obtains tilt measurements, and buffers them in buffer 315. Each tilt measurement and positioning measurement may include a time stamp that identifies when the measurement was obtained. Thereby, tilt measurements and positioning measurements having a same time stamp can be associated with one another. For example, multiple positioning measurements having the same time stamp may be associated to form a set of positioning measurements, and the set may be associated with a tilt measurement. Alternatively, tilt measurements may be associated with positioning measurements without use of time stamps. For example, a first in first out technique may be used such that a first tilt measurement is associated with a first positioning measurement (or set of positioning measurements), a second tilt measurement is associated with a second positioning measurement, and so on. Alternatively, the tilt and positioning measurements may be stored together in a database, associated with each other as data/metadata, or logically connected in some other way. Each set of positioning measurements, once processed, may represent an intermediate position result. Upon further processing, intermediate position results may be used to determine a final position result.

In one embodiment, a measurement quality determiner 320 is connected with buffer 315, GNSS receiver 340 and survey controller 380. Measurement quality determiner 320 uses the tilt measurements to determine a degree of accuracy of the associated positioning measurements, and therefore of the intermediate position result that is based on the positioning measurements.

In one embodiment, measurement quality determiner 320 compares each tilt measurement to a tilt threshold. If the tilt measurement equals or exceeds the tilt threshold, in one embodiment measurement quality determiner 320 rejects the associated positioning measurements. If the tilt measurement is less than the tilt threshold, then the measurement quality determiner 320 accepts the associated positioning measurements. Accepted positioning measurements are then passed on to GNSS receiver 340, and may be used to determine a final position result. Thus, positioning measurements that are associated with tilt measurements that exceed the tilt threshold can be filtered out.

TABLE 1

Filtered Positioning Measurements

| | Data Point | | | | | |
|---|---|---|---|---|---|---|
| | 1 | 2 | 3 | 4 | 5 | |
| | | | | | | Unfiltered Result |
| Intermediate Position Results | 9 | 10 | 11 | 12 | 17 | 11.8 |
| Tilt Measurement | 3 | 1 | 0 | 1 | 4 | — |
| Accept/ Reject | Reject | Accept | Accept | Accept | Reject | Filtered Result |
| Filtered Data | 0 | 10 | 11 | 12 | 0 | 11.0 |

Table 1 illustrates example intermediate position results that are used to calculate a final position result. The intermediate position results may represent 3-dimensional position coordinates (e.g., longitude, latitude and height in a geodetic reference frame or x, y, z in an earth centered earth fixed reference frame). The intermediate position results may also represent 2-dimensional position coordinates (e.g., longitude and latitude). For the sake of brevity, the example intermediate position results used in table 1 (as well as those used in table 2 and table 3 below) are provided in a simplified format as a single value, which may represent a single component of a 2-D or 3-D position coordinate. In the example, a tilt threshold of 2 degrees is applied to the intermediate position results. Therefore, intermediate position results associated with a tilt measurement of 2 degrees or more are rejected and intermediate position results associated with a tilt measurement of less than 2 degrees are accepted. For the sake of simplicity, the example uses whole units of measurement (e.g., 1 degree as opposed to 1.235 degrees).

In the example, an actual position of a measured location is 11. The example includes five data points taken by a surveying apparatus that has measured the location. Each data point is associated with an intermediate position result that has been determined from a set of positioning measurement. Each data point is also associated with a tilt measurement, which is used to determine whether to accept or reject the intermediate position result. Data points 1 and 5 are associated with tilt measurements that exceed the tilt threshold, and are therefore rejected. Data points 2-4 are associated with tilt measurements that are less than the tilt threshold, and are therefore accepted.

The unfiltered position result shows the final position result that would be calculated if all data points are used in the calculation. The unfiltered result is calculated by summing the intermediate position result values and dividing by the number of data points, and results in a value of 11.8. The filtered position result is calculated by summing the accepted intermediate position result values and dividing by the number of accepted data points, and results in a value of 11. A final position result that is calculated after rejecting intermediate position results associated with tilt measurements that exceed a tilt threshold will typically be more accurate than a final position result in which no tilt threshold is applied. At worst, the final position result that applies such a tilt threshold will be no worse than a final position result in which no tilt threshold is applied.

Referring to FIG. 3, in another embodiment, measurement quality determiner 320 determines a weighting factor to apply to each set of positioning measurements based on the associated tilt measurement. In a further embodiment, the weighting factor is based on degree of tilt and does not rely on direction of tilt. The weighting factor may provide optimal results if the tilt is 'random' rather than a bias in any direction. Such 'random' conditions may occur as the user is trying to keep the survey pole vertical.

In one embodiment, to determine a weighting factor based on the tilt measurement, measurement quality determiner 320 may compare the tilt measurement to multiple tilt thresholds, each of which is associated with a distinct weighting factor. An appropriate weighting factor can be applied to a set of positioning measurements based on that weighting factor's associated tilt threshold. For example, measurement quality determiner 320 may include 4 tilt thresholds, including a 1 degree threshold, a 2 degree threshold, a 3 degree threshold and a 4 degree threshold. The 1 degree tilt threshold may be associated with a weighting factor of 0.9, the 2 degree tilt threshold may be associated with a weighting factor of 0.8, and so on. Therefore, measurements having a smaller degree of tilt may be weighted more heavily (e.g., associated with larger weighting factors) for calculating a final position result.

In one embodiment, measurement quality determiner 320 calculates a weighting factor for each positioning measurement. Alternatively, measurement quality determiner 320 calculates a weighting factor for each set of positioning measurements. A set of positioning measurements may include all positioning measurements that are obtained at the same point in time (e.g., those that share a time stamp). Each positioning measurement in a set may be obtained from a different satellite. Calculation of a weighting factor may employ a linear algorithm, an exponential algorithm, a logarithmic algorithm, a more complicated polynomial algorithm, etc. Regardless of the specific algorithm used, as a degree of tilt increases, the calculated weighting factor is decreased. Therefore, positioning measurements associated with greater degrees of tilt will have a smaller influence on a final position result.

Once a weighting factor is determined for a positioning measurement or set of positioning measurements, the weighting factor and positioning measurements can be transmitted to GNSS receiver 340 and/or to the RTK engine 330. In one embodiment, GNSS receiver 340 can then use the positioning measurements (e.g., sets of positioning measurements) to determine intermediate position results, which can be used with the associated weighting factors to determine a final position result. In one embodiment, GNSS receiver 340 forwards positioning measurements and weighting factors to RTK engine 330 for calculation of intermediate position results and a final position result. In another embodiment, GNSS receiver 340 may be bypassed, and measurement quality determiner 320 forwards positioning measurements and/or weighting factors directly to RTK engine 330.

TABLE 2

Weighted Positioning Measurements

|  | Data Point | | | | | | |
| --- | --- | --- | --- | --- | --- | --- | --- |
|  | 1 | 2 | 3 | 4 | 5 | Sum | |
|  |  |  |  |  |  |  | Unweighted Result |
| Intermediate Position Results | 9 | 10 | 11 | 12 | 13 | 55 | 11 |
| Tilt Measurement | 1 | 0 | 1 | 2 | 3 | — | — |
| Weighting | 0.8 | 1.0 | 0.8 | 0.5 | 0.3 | 3.4 | Weighted Result |
| Weighted Data | 7.2 | 10 | 8.8 | 6 | 3.9 | 35.9 | 10.56 |

Table 2 illustrates example intermediate position results that are used to calculate a final position result. In the example, different weighting factors are applied to each intermediate position result based on an associated tilt measurement, which may be represented in degrees, radians, etc. A weighting factor of 1.0 is applied to those intermediate position results associated with a tilt measurement of 0. A weighting factor of 0.8 is applied to those intermediate position results associated with a tilt measurement of 1. A weighting factor of 0.5 is applied to those intermediate position results associated with a tilt measurement of 2. Finally, a weighting factor of 0.3 is applied to those intermediate position results associated with a tilt measurement of 3.

In the example, an actual position of a measured location is 10. The example includes five data points taken by a surveying apparatus that has measured the location. Each data point is associated with an intermediate position result that has been determined from a set of positioning measurements. Each data point is also associated with a tilt measurement, which is used to determine a weighting factor to apply to the intermediate position result. Data point 1 is associated with a tilt measurement of 1, and therefore a weighting factor of 0.8 is applied to data point 1 to yield a weighted value of 7.2. Data point 2 is associated with a tilt measurement of 0, and therefore a weighting factor of 1.0 is applied to data point 2 to yield a weighted value of 10. Data point 3 is associated with a tilt measurement of 1, and therefore a weighting factor of 0.8 is applied to data point 3 to yield a weighted value of 8.8. Data point 4 is associated with a tilt measurement of 2, and therefore a weighting factor of 0.5 is applied to data point 4 to yield a weighted value of 6. Finally, data point 5 is associated with a tilt measurement of 3, and therefore a weighting factor of 0.3 is applied to data point 5 to yield a weighted value of 3.9.

The unweighted position result shows a final position result that would be calculated if no weighting factors were used in the calculation. The unweighted result is calculated by summing the intermediate position result values and dividing by the number of data points, and results in a value of 11. The weighted position result is calculated by dividing the sum of the weighted data by the sum of the weighting factors applied, and results in a value of 10.56 (which is closer than the unweighted result to the true value of 10). A final position result that is calculated using weighting factors will typically be more accurate than a final position result in which no weighting factors are applied. At worst, the final position result that applies weighting factors will be no less accurate than a final position result in which no weighting factors are applied.

Returning to FIG. 3, in one embodiment, measurement quality determiner 320 determines weighting factors, applies the weighting factors to positioning measurements (e.g., sets of positioning measurements) associated with tilt measurements below a tilt threshold, and rejects positioning measurements that are associated with tilt measurements that exceed a tilt threshold. For example, a weighting factor may be determined for all positioning measurements associated with a tilt measurement that is less than 10 degrees. Such positioning measurements and their associated weighting factors may be forwarded to GNSS receiver 340 and/or RTK engine 330. Meanwhile, positioning measurements associated with a tilt measurement that is greater than or equal to 10 degrees may be rejected, and not forwarded on to GNSS receiver 340 or RTK engine 330. In another embodiment, weighting factors may be applied to measurements in a certain range, for example between 2 and 10 degrees. In this instance, no weighting is applied to measurements having a tilt of less than 2 degrees, and measurements associated with a tilt of greater than 10 degrees are discarded.

TABLE 3

Weighted Positioning Measurements

|  | Data Point | | | | | | |
| --- | --- | --- | --- | --- | --- | --- | --- |
|  | 1 | 2 | 3 | 4 | 5 | Sum | |
|  |  |  |  |  |  |  | Unweighted Result |
| Intermediate Position Results | 17 | 10 | 11 | 12 | 13 | 63 | 12.6 |
| Tilt Measurement | 4 | 1 | 0 | 1 | 2 | — | — |
| Weighting | 0 | 0.5 | 1.0 | 0.5 | 0.25 | 2.25 | Weighted Result |
| Weighted Data | 0 | 5 | 11 | 6 | 3.25 | 25.25 | 11.22 |

Table 3 illustrates example intermediate position results that are used to calculate a final position result. In the example, different weighting factors are applied to each intermediate position result based on an associated tilt measurement. A weighting factor of 1.0 is applied to those intermediate position results associated with a tilt measurement of 0. A weighting factor of 0.5 is applied to those intermediate position results associated with a tilt measurement of 1. A weighting factor of 0.25 is applied to those intermediate position results associated with a tilt measurement of 2. Finally, those intermediate position results associated with a tilt measurement of 3 or greater are rejected (a weighting factor of 0 is applied to them).

In the example, an actual position of a measured location is 11. The example includes five data points taken by a surveying apparatus that has measured the location. Data point 1 is associated with a tilt measurement of 4, and therefore a weighting factor of 0 is applied to data point 1, thereby rejecting the data point. Data point 2 is associated with a tilt measurement of 1, and therefore a weighting factor of 0.5 is applied to data point 2 to yield a weighted value of 5. Data point 3 is associated with a tilt measurement of 0, and therefore a weighting factor of 1.0 is applied to data point 3 to yield a weighted value of 11. Data point 4 is associated with a tilt measurement of 1, and therefore a weighting factor of 0.5 is applied to data point 4 to yield a weighted value of 6. Finally, data point 5 is associated with a tilt measurement of 2, and therefore a weighting factor of 0.25 is applied to data point 5 to yield a weighted value of 3.25.

The unweighted position result has a value of 12.6. The weighted position result is calculated by dividing the sum of the weighted data by the sum of the weighting factors applied, and results in a value of 11.22. As shown in this example, applying a combination of weighting factors and tilt thresholds to position measurements can improve the accuracy of final position results.

Referring again to FIG. 3, intermediate position results may be calculated by the GNSS receiver 340 and/or RTK engine 330 as positioning measurements and/or weighting factors are received from measurement quality determiner 320. A final position result may be calculated based on a weighted average of the final position measurements using the weighting factors (e.g., as illustrated in table 2 and table 3), or by using other statistical weighting techniques.

As more positioning measurements (and weighting factors) are obtained, more intermediate position results may be calculated, and the calculated final position result may increase in accuracy. In one embodiment, positioning measurements are obtained until a final position result having a specified accuracy is calculated. The degree of accuracy may be specified by a user via a survey controller 180, or selected automatically by survey controller 180, GNSS receiver 140 or RTK engine 330. In some instances, it may not be possible to attain a specified degree of accuracy for the final position result (e.g., if the geometry of the available satellites is poor, the user cannot hold the survey pole steady, etc.). In other instances, a user may determine after a final position result has been calculated that a higher degree of accuracy is desired. In either case, in one embodiment the specified degree of accuracy may be modified. In other embodiments, positioning measurements are obtained until a specified number of positioning measurements are obtained, a specified number of intermediate position results may be determined and/or until a specified time period has expired. In another embodiment, positioning measurements are obtained until subsequent sets of measurements do not increase the accuracy of the calculated position result.

If the specified degree of accuracy is modified, buffered tilt measurements and positioning measurements are re-evaluated by measurement quality determiner 320. In one embodiment, measurement quality determiner 320 can apply new tilt thresholds and/or determine new weighting factors for the buffered positioning measurements. GNSS receiver 340 and/or RTK engine 330 can then calculate new intermediate position results and/or a new final position result based on accepted positioning measurements and/or new weighting factors. In one embodiment, even "discarded" measurements are retained in the buffer until a calculated final position result is accepted by the user.

In one embodiment, electronic tilt sensor 367, measurement quality determiner 320 and GNSS receiver 340 are connected with survey controller 380. The connection may be a permanent, temporary, sporadic, wired, or wireless connection. Survey controller 380 includes a user interface 340 and one or more feedback indicators 345 (e.g., tactile, audio, visual, etc.). Feedback indicators 345 may provide user feedback if one or more conditions are detected. For example, feedback indicators 345 may notify a user when positioning measurements are rejected by measurement quality determiner 320.

User interface 340 may include a display and one or more inputs (e.g., a touch-screen). User interface 340 permits a user to provide commands to, and otherwise interact with, surveying equipment 300. For example, a surveyor may indicate a required degree of accuracy for a position result via a user interface 340. User interface 340 may also display the current position result, accuracy of the current position result, current tilt measurement, etc.

In one embodiment, each of the measurement quality determiner 320, GNSS receiver 340, RTK engine 330 and survey controller 380 includes hardware logic executed by a microcontroller, field programmable gate array (FPGA), application specific integrated circuit (ASIC), or other dedicated processing unit. The measurement quality determiner 320, GNSS receiver 340, RTK engine 330 and/or survey controller 380 may be executed by a single hardware logic, or they may each be executed by separate hardware logics. Alternatively, one or more of the measurement quality determiner 320, GNSS receiver 340, RTK engine 330 and survey controller 380 can be implemented as a series of state machines (e.g., an internal logic that knows how to perform a sequence of operations), logic circuits (e.g., a logic that goes through a sequence of events in time, or a logic whose output changes immediately upon a changed input [i.e., sequential logic or combinational logic]), or a combination of a state machines and logic circuits.

In the illustrated embodiment, the GNSS receiver 340, RTK engine 330 and measurement quality determiner 320 are each included in a processor 375. In another embodiment, processor 375 may include, for example, GNSS receiver 340 and RTK engine 340. In one embodiment, one or more of the RTK engine 330, GNSS receiver 340 and measurement quality determiner 320 may be included in separate processors (not shown). Processor 375 (and/or additional processors) may include dedicated hardware logic as described above. Processor 375 (and/or additional processors) may also include one or more general-purpose processing devices in addition to or instead of dedicated hardware logic. Such general-purpose processing devices may include a microprocessor, a central processing unit, a complex instruction set computing (CISC) microprocessor, a reduced instruction set computing (RISC) microprocessor, a very long instruction word (VLIW) microprocessor, or a processor implementing other instruction sets, or processors implementing a combination of instruction sets.

Figure 4A:
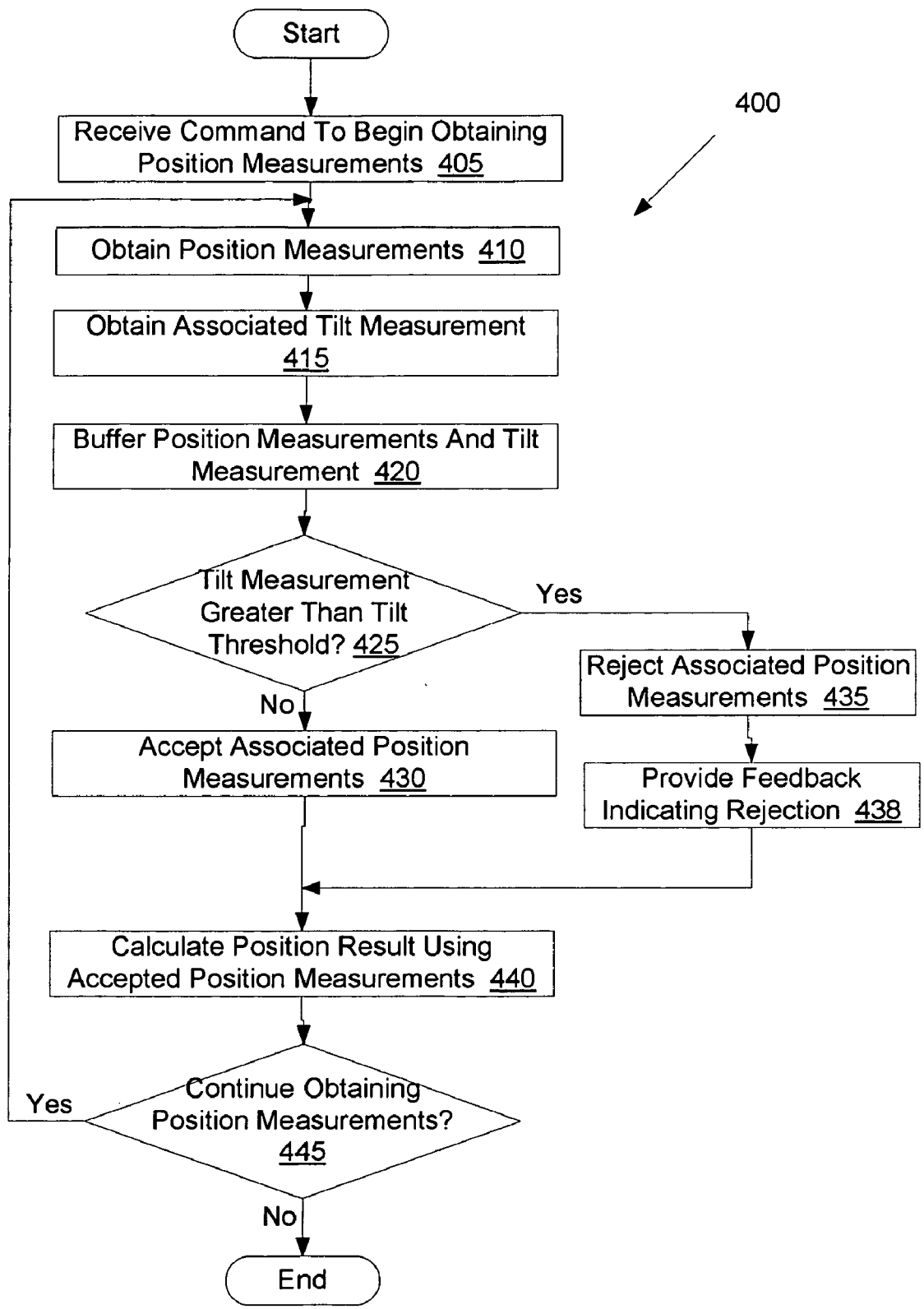
FIG. 4A is a flow diagram illustrating one embodiment of a process for determining a precise position of the measured point.

FIG. 4A is a flow diagram illustrating one embodiment of a process 400 for determining a precise position of a measured point. The process may be performed by processing logic that comprises hardware (e.g., circuitry, dedicated logic, programmable logic, microcode, etc.), software (e.g., instructions run on a processing device to perform hardware simulation), or a combination thereof. In one embodiment, process 400 is performed by surveying equipment 300 of FIG. 3. Portions of process 400 may be implemented by logic in a survey controller 380 and/or GNSS receiver 340, as shown in FIG. 3. Portions may also be implemented by logic in a server, personal computer, or other computing device during post processing of survey data (away from the location surveyed). In accordance with certain embodiments of the invention, surveying equipment 300 establishes a communication link with one or more base stations or a VRS network prior to executing process 400. In a further embodiment, process 400 begins when processing logic receives a command to begin taking measurements (e.g., via a survey controller 380).

Referring to FIG. 4A, process 400 includes processing logic receiving a command to begin obtaining positioning measurements (block 405). At block 410, a set of positioning measurements is obtained. Each positioning measurement in the set may be from a different satellite. Obtaining positioning measurements may include receiving positioning signals from one or more satellites by a GNSS antenna 160, and detecting the positioning signals to obtain positioning measurements by a GNSS receiver 140. At block 415, a tilt measurement is obtained that is associated with the set of positioning measurements. Tilt measurements may be associated with positioning measurements based on a time stamp, based on an order of receipt, or based upon other criteria. At block 420, the positioning measurements and the tilt measurement are buffered.

A block 425, processing logic determines whether the tilt measurement is greater than a tilt threshold (e.g., 3 degrees, 10 degrees, etc.). If the tilt measurement is greater than the tilt threshold, the process proceeds to block 435. If the tilt measurement is below the tilt threshold, the process continues to block 430.

At block 435, the set of positioning measurements associated with the tilt measurement are rejected. This provides quality control for obtained positioning measurements. For example, those positioning measurements that have a degree of accuracy that is lower than a specified limit may be rejected. At block 438, feedback is provided indicating that the positioning measurements have been rejected. The feedback may include tactile feedback (e.g., a vibration), audio feedback (e.g., a beep, buzz, an alert message, etc.), and/or visual feedback (e.g., a solid or blinking light, text, etc.). Such feedback may alert a user to adjust surveying equipment to obtain a vertical orientation. The process then continues to block 410, to obtain additional sets of positioning measurements.

If, at block 425, the tilt measurement was within acceptable range, the process continues to block 430. At block 430, the set of positioning measurements is accepted. At block 440, an intermediate position result is calculated from the set of positioning measurements. A final position result may then be calculated from all determined intermediate position results.

At block 445, processing logic determines whether to obtain additional positioning measurements. Generally, as more positioning measurements are obtained, more intermediate position results can be determined and a greater degree of accuracy of a final position result is obtained. In one embodiment, processing logic continues to obtain positioning measurements if the current calculated final position result does not meet a specified degree of accuracy. Alternatively, additional positioning measurements may be obtained if a specified time limit has not expired, if a specified number of positioning measurements have not yet been obtained, etc. If additional positioning measurements are to be obtained, the process returns to block 410. Otherwise, the process ends.

Figure 4B:
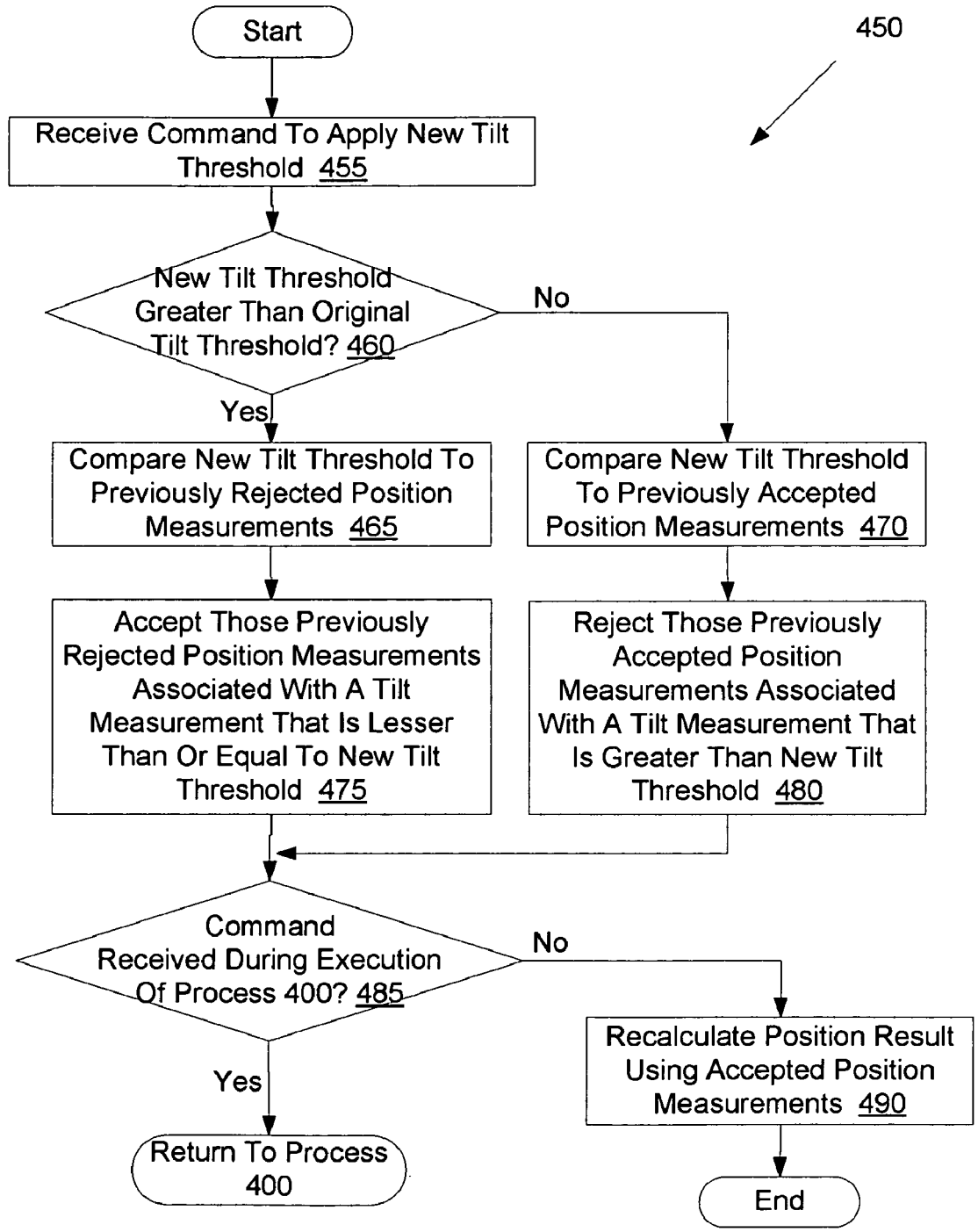
FIG. 4B is a flow diagram illustrating another embodiment of a process for determining a precise position of a measured point.

FIG. 4B is a flow diagram illustrating another embodiment of a process 450 for determining a precise position of a measured point. The process may be performed by processing logic that comprises hardware (e.g., circuitry, dedicated logic, programmable logic, microcode, etc.), software (e.g., instructions run on a processing device to perform hardware simulation), or a combination thereof. In one embodiment, process 450 is performed by surveying equipment 300 of FIG. 3. Portions of process 450 may be implemented by logic in a survey controller 380 and/or GNSS receiver 340. Portions may also be implemented by logic in a server, personal computer, or other computing device during post processing (away from the location surveyed). Process 450 can be implemented anytime during or after execution of process 400.

Referring to FIG. 4B, process 450 includes processing logic receiving a command to apply a new tilt threshold (block 455). This command may be received at any time during or after execution of process 400. At block 460, processing logic determines whether the new tilt threshold is greater than (less restrictive than) the original tilt threshold. If the new tilt threshold is greater than the original tilt threshold, the process continues to block 465. Otherwise, the process continues to block 470.

At block 465, the new tilt threshold is compared to the tilt measurements associated with previously rejected positioning measurements. In one embodiment, these tilt measurements and positioning measurements are obtained from a buffer (e.g., buffer 410 of FIG. 3). At block 475, those positioning measurements that were previously rejected and that are associated with tilt measurements that are lesser than or equal to the new tilt threshold are accepted. The process then continues to block 485.

At block 470, the new tilt threshold is compared to the tilt measurements associated with previously accepted positioning measurements. In one embodiment, these tilt measurements and positioning measurements are obtained from a buffer (e.g., buffer 410 of FIG. 3). At block 480, those positioning measurements that were previously accepted and that are associated with a tilt measurement that is greater than the new tilt threshold are rejected. The process then continues to block 485.

A block 485, processing logic determines whether the command to apply a new tilt threshold was received during execution of process 400. If the command was received during execution of process 400, then process 400 continues, but with the new tilt threshold (e.g., at block 425 the tilt measurement is compared to the new tilt threshold). At block 440 of process 400, processing logic could then determine new intermediate position results and calculate the final position result using the newly accepted position measurements (e.g., those from the buffer). In one embodiment, the process continues to block 445, to determine whether additional measurements need to be obtained, in light of the change. If the command was not received during execution of process 400, the process continues to block 490. At block 490, intermediate position results and the final position result are recalculated using the accepted positioning measurements. The process then ends.

Figure 5:
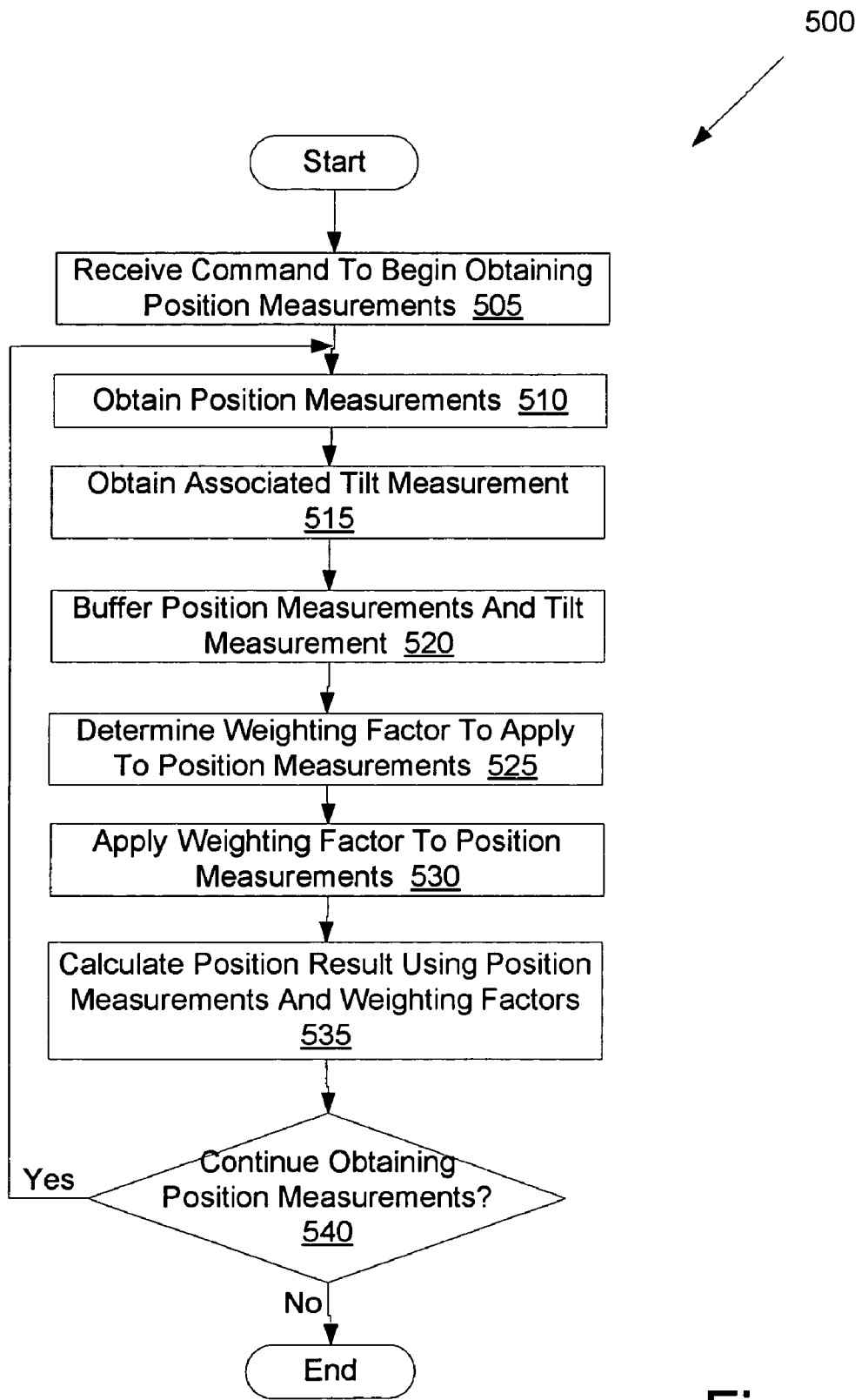
FIG. 5 is a flow diagram illustrating yet another embodiment of a process for determining a precise position of a measured point.

FIG. 5 is a flow diagram illustrating yet another embodiment of a process 500 for determining a precise position of a measured point. The process may be performed by processing logic that comprises hardware (e.g., circuitry, dedicated logic, programmable logic, microcode, etc.), software (e.g., instructions run on a processing device to perform hardware simulation), or a combination thereof. In one embodiment, process 500 is performed by surveying equipment 300 of FIG. 3. Portions of process 500 may be implemented by logic in a survey controller 380 and/or GNSS receiver 340. Portions may also be implemented by logic in a server, personal computer, or other computing device during post processing (away from the location surveyed). In accordance with certain embodiments of the invention, surveying equipment 300 establishes a radio link (or other communication link) with a base station prior to executing process 500. In a further embodiment, process 500 begins when processing logic receives a command to begin taking measurements (e.g., via a survey controller 380).

Referring to FIG. 5, process 500 includes processing logic receiving a command to begin obtaining positioning measurements (block 505). At block 510, positioning measurements are obtained. Obtaining positioning measurements may include receiving a set of positioning signals from one or more satellites by a GNSS antenna 160, and detecting the set of positioning signals to obtain a set of positioning measurements by a GNSS receiver 140. At block 515, a tilt measurement associated with the set of positioning measurements is obtained. Tilt measurements may be associated with positioning measurements based on a time stamp, based on an order of receipt, or based upon other criteria. At block 520, the positioning measurements and the tilt measurement are buffered.

At block 525, processing logic determines a weighting factor to apply to the set of positioning measurements. In one embodiment, weighting factors are between 1 and 0.1 (e.g., 0.9, 0.75, etc.). The weighting factor may be determined based on the associated tilt measurement. In one embodiment, the associated tilt measurement is compared to multiple tilt thresholds, each tilt threshold being associated with a distinct weighting factor. The weighting factor associated with the tilt threshold that is closest to the tilt measurement may be applied to the associated set of positioning measurements. Alternatively, the weighing factor associated with the range that the actual tilt measurement falls into is applied. In another embodiment, the weighting factor is calculated by applying the tilt measurement to a weighting factor algorithm.

At block 530, the weighting factor is applied to the set of positioning measurements. In one embodiment, applying the weighting factor to the set of positioning measurements includes associating the weighting factor with the set of positioning measurements. Alternatively, applying the weighting factor to the set of positioning measurements may include multiplying the weighting factor by the set of positioning measurements, or performing another mathematical operation on the set of positioning measurements based on the weighting factor.

At block 535, an intermediate position result is calculated using the positioning measurements, and a final position result is calculated using the intermediate position result, additional intermediate position results and/or the weighting factors. The final position result may be calculated by taking a weighted average of the intermediate position results (e.g., using the weighting factors), or by applying other weighted statistical computation techniques.

At block 540, processing logic determines whether to continue obtaining positioning measurements. In another embodiment, the process may initially determine whether additional positioning measurements should be obtained without calculating the actual intermediate and/or final position results. For example, an initial set of measurements passing the minimum tilt quality may be obtained, prior to calculating. If additional positioning measurements are to be obtained, the process returns to block 510, and additional sets of positioning measurements may be obtained, additional intermediate position results may be determined, etc. Otherwise, the process ends.

Figure 6:
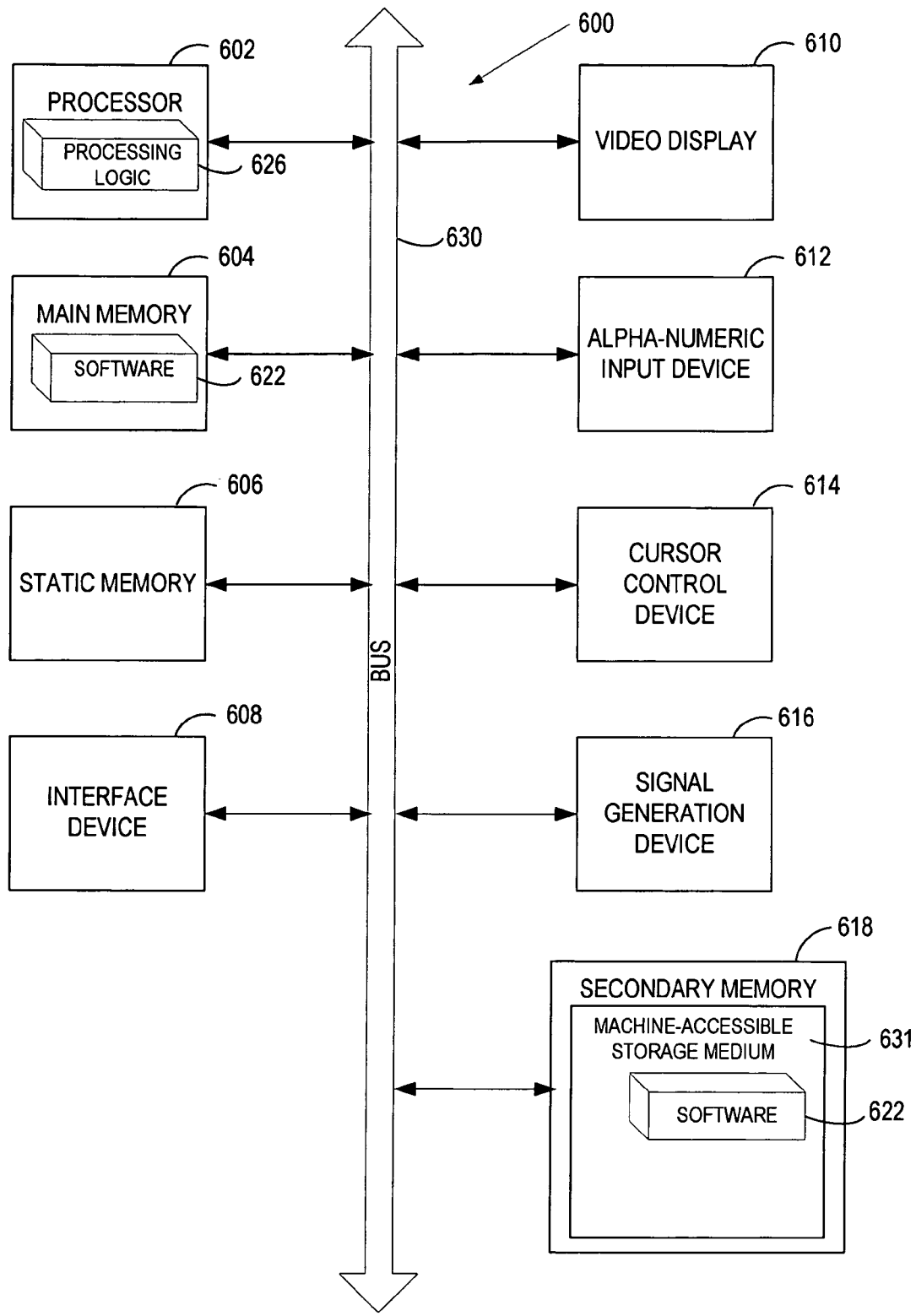
FIG. 6 illustrates a diagrammatic representation of a machine in the exemplary form of a computer system, in accordance with one embodiment of the present invention.

FIG. 6 illustrates a diagrammatic representation of a machine in the exemplary form of a computer system 600 within which a set of instructions, for causing the machine to perform any one or more of the methodologies discussed herein, may be executed. Computer system 600 may be representative of, for example, GNSS receiver 140 or survey controller 180 of FIG. 3. The machine may be connected (e.g., networked) to other machines via a radio transceiver 170. While only a single machine is illustrated, the term "machine" shall also be taken to include any collection of machines that individually or jointly execute a set (or multiple sets) of instructions to perform any one or more of the methodologies discussed herein.

The exemplary computer system 600 includes a processing device (processor) 602, a main memory 604 (e.g., read-only memory (ROM), flash memory, dynamic random access memory (DRAM) such as synchronous DRAM (SDRAM) or Rambus DRAM (RDRAM), etc.), and a static memory 606 (e.g., flash memory, static random access memory (SRAM), etc.), which may communicate with each other via a bus 630. Alternatively, the processing device 602 may be connected to memory 604 and/or 606 directly or via some other connectivity means.

Processing device 602 represents one or more general-purpose processing devices such as a microprocessor, central processing unit, graphical accelerator, or the like. More particularly, the processing device 602 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. The processing device 602 is configured to execute processing logic 626 for performing the operations and steps discussed herein.

The computer system 600 may further include an interface device 608 and/or a signal generation device 616. It also may or may not include a video display unit (e.g., a liquid crystal display (LCD) or a cathode ray tube (CRT)), an alphanumeric input device (e.g., a keypad), and/or a cursor control device (e.g., a touch screen). In one embodiment, the interface device 608 includes voice recognition input and/or controller to be used to receive commands.

The computer system 600 may or may not include a secondary memory 618 (e.g., a data storage device) having a machine-accessible storage medium 631 on which is stored one or more sets of instructions (e.g., software 622) embodying any one or more of the methodologies or functions described herein. The software 622 may also reside, completely or at least partially, within the main memory 604 and/or within the processing device 602 during execution thereof by the computer system 600, the main memory 604 and the processing device 602 also constituting machine-accessible storage media.

The machine-readable storage medium 631 may also be used to store a measurement quality determiner (e.g., the measurement quality determiner 320 of FIG. 3), and/or a software library containing methods that call a measurement quality determiner. While the machine-accessible storage medium 631 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instructions for execution by the machine and that cause the machine to perform any one or more of the methodologies of the present invention. The term "machine-accessible storage medium" shall accordingly be taken to include, but not be limited to, solid-state memories, and optical and magnetic media.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A survey apparatus comprising:
an antenna to receive a positioning signal;
a tilt sensor to obtain a tilt measurement that indicates a degree of tilt of the survey apparatus;
a measurement quality determiner configured to compare the tilt measurement to a first tilt threshold, and to reject the positioning measurement if the tilt measurement indicates a degree of tilt that is greater than the first tilt threshold; and
a processor to obtain a positioning measurement from the positioning signal, and to determine a weighting factor for the positioning measurement based on the tilt measurement.

2. The survey apparatus of claim 1, further comprising:
a buffer to buffer the plurality of positioning measurements; and
a survey controller to receive a command to apply a second tilt threshold that is different from the first tilt threshold;
the measurement quality determiner configured to, if the second tilt threshold is greater than the first tilt threshold, for each of the previously rejected positioning measurements, accept the positioning measurement if it is associated with a tilt measurement that has a value less than or equal to the second tilt threshold;
the measurement quality determiner further configured to, if the second tilt threshold is lower than the first tilt threshold, for each of the previously accepted positioning measurements, reject the positioning measurement if it is associated with a tilt measurement that has a value greater the second tilt threshold.

3. The survey apparatus of claim 1, further comprising:
a GNSS receiver, connected with at least one of the processor and the antenna, to obtain at least one set of positioning measurements and the weighting factor associated with the set of positioning measurements, and to calculate a position result.

4. The survey apparatus of claim 1, further comprising:
at least one of an audio feedback indicator, a visual feedback indicator or a tactile feedback indicator to provide feedback to a user in response to a rejection of the positioning measurement.

5. A computer implemented method comprising:
obtaining a plurality of sets of positioning measurements using a GNSS antenna that is attached to a survey pole;
obtaining a plurality of tilt measurements that indicate a degree of tilt of the survey pole using a tilt sensor that is attached to the survey pole, wherein each of the plurality of tilt measurements is associated with a corresponding set of positioning measurements;
determining whether to accept or reject each of the sets of positioning measurements based on the corresponding tilt measurement; and
calculating a position result using the accepted sets of positioning measurements.

6. The method of claim 5, further comprising:
for each of the plurality of sets of positioning measurements, comparing the associated tilt measurement to a first tilt threshold; and
rejecting those of the plurality of sets of positioning measurements that are associated with a tilt measurement that is greater than the tilt threshold.

7. The method of claim 5, further comprising:
buffering the plurality of sets of positioning measurements in a buffer;

receiving a command to apply a second tilt threshold that is higher than the first tilt threshold;
for each of the previously rejected set of positioning measurements, accepting the set of positioning measurements if it is associated with a tilt measurement that has a value less than or equal to the second tilt threshold; and
recalculating the position result using the accepted measurements.

8. The method of claim 5, further comprising:
receiving a command to apply a second tilt threshold that is lower than the first tilt threshold;
for each of the previously accepted sets of positioning measurements, rejecting the set of positioning measurements if it is associated with a tilt measurement that has a value greater than the second tilt threshold; and
recalculating the position result using the accepted measurements.

9. The method of claim 5, further comprising:
upon obtaining a set of positioning measurements, providing at least one of audio, visual, or tactile feedback if the set of positioning measurement is rejected.

10. A computer implemented method comprising:
obtaining a plurality of sets of GNSS positioning measurements that indicate a position of a surveying device;
obtaining a plurality of tilt measurements that indicate a degree of tilt of the surveying device, wherein each of the plurality of tilt measurements is associated with a set of positioning measurements;
for each set of positioning measurements, applying a weighting factor to the set of positioning measurements based on the associated tilt measurement, wherein the weighting factor represents an amount of error caused by the degree of tilt;
for each set of positioning measurements, comparing the set of positioning measurements to a plurality of tilt thresholds to determine one of a plurality of weighting factors to associate with the set of positioning measurements; and
calculating a position result using the plurality of sets of positioning measurements and the weighting factors.

11. The method of claim 10, further comprising:
for each set of positioning measurements, calculating the weighting factor.

12. The method of claim 10, further comprising:
upon obtaining a tilt measurement, providing at least one of audio, visual, or tactile feedback if the degree of tilt is greater than a tilt threshold.

13. A system comprising:
a surveying pole;
a GNSS antenna, connected with the surveying pole, to obtain a plurality of sets of positioning signals;
a tilt sensor, connected with the surveying pole, to obtain a plurality of tilt measurements that indicate a degree of tilt of the surveying pole;
a first logic, electrically connected with the GNSS antenna and the tilt sensor, to obtain a plurality of sets of positioning measurements from the plurality of sets of positioning signals, to receive the plurality of tilt measurements, to associate each set of positioning measurements with one of the plurality of tilt measurements, and to determine whether to accept or reject each set of positioning measurements based on the associated tilt measurement; and
a second logic, connected with the first logic, to calculate a position of one end of the pole by using the accepted sets of positioning measurements.

14. The system of claim 13, wherein the first logic is configured to compare the tilt measurement associated with each set of positioning measurements to a first tilt threshold, and to reject those of the plurality of sets of positioning measurements that are associated with a tilt measurement that is greater than the first tilt threshold.

15. The system of claim 14, further comprising:
a buffer to buffer the plurality of sets of positioning measurements and the plurality of tilt measurements.

16. The system of claim 15, wherein the first logic is configured to, upon receiving a command to apply a second tilt threshold, accept one or more previously rejected sets of positioning measurements or reject one ore more previously accepted sets of positioning measurements, and to recalculate the position of the point.

17. The system of claim 13, further comprising:
at least one of an audio feedback indicator, a visual feedback indicator or a tactile feedback indicator to provide feedback to a user upon obtaining a rejected set of positioning measurements.

18. A georeferencing system comprising:
a surveying pole;
a GNSS antenna, connected with the surveying pole, to obtain a plurality of sets of positioning signals, and to transmit the plurality of sets of positioning signals to a GNSS receiver; and
a tilt sensor, connected with the surveying pole, to obtain a plurality of tilt measurements that indicate a degree of tilt of the surveying pole, and to transmit the plurality of tilt measurements to the GNSS receiver;
the GNSS receiver being coupled with the GNSS antenna and the tilt sensor, to obtain a plurality of sets of positioning measurements from the plurality of sets of positioning signals, to receive the plurality of tilt measurements, to associate each set of positioning measurements with a corresponding one of the plurality of tilt measurements, to apply a weighting factor to each set of positioning measurements based on the associated tilt measurement, wherein the weighting factor represents an amount of error caused by the degree of tilt, and to calculate a position of a point located at approximately one end of the surveying pole using the sets of positioning measurements and the weighting factors, wherein the GNSS receiver is configured to, for each set of positioning measurements, compare the tilt measurement to a plurality of tilt thresholds to determine one of a plurality of distinct weighting factors to associate with the set of positioning measurements, wherein each of the plurality of tilt thresholds is associated with a distinct weighting factor.

19. The georeferencing system of claim 18, wherein the GNSS receiver is configured to calculate a distinct weighting factor for each set of positioning measurements based on that set's associated tilt measurement.

20. The georeferencing system of claim 18, further comprising:
at least one of an audio feedback indicator, a visual feedback indicator or a tactile feedback indicator to provide feedback to a user upon obtaining a tilt measurement if the degree of tilt is greater than a tilt threshold.

* * * * *